US012729567B2

(12) United States Patent
Schiffer et al.

(10) Patent No.: US 12,729,567 B2
(45) Date of Patent: Sep. 8, 2026

(54) MOTOR VEHICLE LOCK, IN PARTICULAR MOTOR VEHICLE DOOR LOCK

(71) Applicant: KIEKERT AG, Heiligenhaus (DE)

(72) Inventors: Holger Schiffer, Meerbusch (DE); Michael Scholz, Essen (DE); Ömer Inan, Dorsten (DE); Peter Szegeny, Engelskirchen (DE); Andreas Schmitz, Velbert (DE); Andreas Ziganki, Mettmann (DE)

(73) Assignee: KIEKERT AG, Heiligenhaus (DE)

( * ) Notice: Subject to any disclaimer, the term of this patent is extended or adjusted under 35 U.S.C. 154(b) by 90 days.

(21) Appl. No.: 18/574,454

(22) PCT Filed: Jul. 18, 2022

(86) PCT No.: PCT/DE2022/100513
§ 371 (c)(1),
(2) Date: Dec. 27, 2023

(87) PCT Pub. No.: WO2023/001334
PCT Pub. Date: Jan. 26, 2023

(65) Prior Publication Data

US 2024/0287835 A1 Aug. 29, 2024

(30) Foreign Application Priority Data

Jul. 19, 2021 (DE) ..................... 10 2021 118 543.2

(51) Int. Cl.
*E05B 77/34* (2014.01)
*E05B 81/06* (2014.01)
(Continued)

(52) U.S. Cl.
CPC .............. *E05B 77/34* (2013.01); *E05B 81/06* (2013.01); *E05B 85/02* (2013.01); *E05B 81/14* (2013.01)

(58) Field of Classification Search
CPC .......... E05B 77/34; E05B 85/02; E05B 81/14; E05B 81/06
See application file for complete search history.

(56) References Cited

U.S. PATENT DOCUMENTS 4,270,783 A * 6/1981 Sorensen ................ E05B 81/25
292/201
4,904,006 A * 2/1990 Hayakawa .............. E05B 81/06
292/216
(Continued)

FOREIGN PATENT DOCUMENTS

CN 104685144 A 6/2015
CN 105625833 A 6/2016
(Continued)

OTHER PUBLICATIONS

International Search Report mailed Oct. 24, 2022, for priority International Application No. PCT/DE2022/100513.

*Primary Examiner* — Kristina R Fulton
*Assistant Examiner* — Emily G. Brown
(74) *Attorney, Agent, or Firm* — Renner, Otto, Boisselle & Sklar, LLP

(57) ABSTRACT

A motor vehicle lock, in particular a motor vehicle door lock, which is equipped with a locking mechanism consisting essentially of a rotary latch and a pawl. Furthermore, at least one electromotive drive is implemented. A control unit and an at least two-part housing having a wet chamber housing part and a dry chamber housing part are also implemented. The drive and the control unit are in each case arranged in the dry chamber housing part, and the locking mechanism is arranged in the wet housing part. According to the invention, both housing parts are arranged in parallel to each other and are sealingly connected to each other on the edge side.

10 Claims, 3 Drawing Sheets

(51) Int. Cl.

| | |
|---|---|
| ***E05B 81/14*** | (2014.01) |
| ***E05B 85/02*** | (2014.01) |

(56) References Cited

U.S. PATENT DOCUMENTS

| | | | | |
|---|---|---|---|---|
| 5,125,702 | A * | 6/1992 | Fukumoto | E05B 77/34 277/642 |
| 5,577,782 | A * | 11/1996 | Johnson | E05B 79/20 292/201 |
| 5,584,515 | A * | 12/1996 | Silye | E05B 81/36 292/201 |
| 5,855,130 | A * | 1/1999 | Rorabacher | E05B 81/25 292/201 |
| 6,349,983 | B1 * | 2/2002 | Dupont | E05B 81/14 292/216 |
| 7,827,836 | B2 * | 11/2010 | Cetnar | E05B 81/16 292/201 |
| 8,870,247 | B2 * | 10/2014 | Yamagata | E05B 85/02 292/216 |
| 9,441,402 | B2 * | 9/2016 | Larsen | E05B 15/0086 |
| 11,959,314 | B2 * | 4/2024 | Graute | E05B 81/86 |
| 2002/0167177 | A1 * | 11/2002 | Erices | E05B 85/02 292/201 |
| 2015/0233151 | A1 * | 8/2015 | Mittelbach | E05B 85/00 70/91 |
| 2016/0115980 | A1 * | 4/2016 | Estrada | E05B 85/02 24/664 |
| 2017/0245378 | A1 | 8/2017 | Taurasi | |
| 2018/0245379 | A1 * | 8/2018 | Taurasi | H05K 5/069 |
| 2020/0224464 | A1 * | 7/2020 | Cumbo | E05B 81/16 |
| 2022/0025678 | A1 * | 1/2022 | Okawa | E05B 81/06 |
| 2022/0259899 | A1 * | 8/2022 | Jeong | E05B 79/20 |

FOREIGN PATENT DOCUMENTS

| | | | | |
|---|---|---|---|---|
| CN | 105658889 | A | 6/2016 | |
| DE | 19622028 | A1 | 12/1996 | |
| DE | 10100010 | A1 | 7/2002 | |
| DE | 202009015560 | U1 * | 3/2011 | E05B 81/16 |
| DE | 202010014396 | U1 | 1/2012 | |
| DE | 102020100405 | A1 | 7/2020 | |
| DE | 112019000052 | T5 | 8/2020 | |
| EP | 2754799 | B1 | 7/2014 | |
| FR | 2656030 | A1 | 6/1991 | |
| FR | 2775016 | A1 * | 8/1999 | E05B 81/14 |

* cited by examiner

MOTOR VEHICLE LOCK, IN PARTICULAR MOTOR VEHICLE DOOR LOCK

This application is a national phase of International Patent Application No. PCT/DE2022/100513 filed Jul. 18, 2022, which claims priority to German Patent Application No. 10 2021 118 543.2 filed Jul. 19, 2021, each of which is hereby incorporated herein by reference in its entirety.

FIELD OF DISCLOSURE

The invention relates to a motor vehicle lock, in particular a motor vehicle door lock, having a locking mechanism consisting essentially of a rotary latch and a pawl, furthermore having at least one electromotive drive and a control unit, and having an at least two-part housing with a wet chamber housing part and a dry chamber housing part, wherein the drive and the control unit are arranged in the dry chamber housing part and the locking mechanism is arranged in the wet chamber housing part.

BACKGROUND OF DISCLOSURE

Motor vehicle locks and in particular motor vehicle door locks are exposed to very different environmental conditions, depending on the climatic regions in which an associated motor vehicle is located. This generally applies to motor vehicle locks, i.e., also those which are not necessarily arranged on and in a motor vehicle door. For example, the motor vehicle lock can be a lock on a backrest, a glove compartment, a tailgate, etc. In general, however, they are motor vehicle door locks, i.e., motor vehicle locks which are mounted in or on motor vehicle doors and ensure that they are locked. The term motor vehicle door is to be interpreted broadly, since this expressly includes not only motor vehicle side doors but also motor vehicle front hoods, motor vehicle tailgates, motor vehicle sliding doors, etc.

These, i.e., the different environmental conditions, include not only different temperatures far below to far above the freezing point (from −50° C. to +80° C.), but also and in particular dust and moisture as well as rain. In fact, the locking mechanism, which essentially consists of a rotary latch and pawl, usually interacts with a motor vehicle locking bolt. This assumes that the locking bolt can enter an inlet mouth of the housing, which is therefore open and consequently exposed to different environmental conditions.

For this reason, the term wet chamber is also used in this context, in contrast to the dry chamber in the interior of a vehicle door, for example, in which safety devices such as side airbags, window regulators, loudspeakers, etc. are located. The dry chamber is in particular protected against splash water compared to the wet chamber. Accordingly, there are already many approaches in the prior art for realizing a flawless and splash-proof as well as very dust-tight separation between the wet chamber and the dry chamber.

For this reason, the generic prior art according to EP 2 754 799 B1 proceeds in such a way that the wet chamber housing part and the dry chamber housing part form an overall L-shaped housing. As a result, a relatively complex mechanical connection between the electromotive drive on the one hand and the locking mechanism on the other hand is realized. In fact, the electromotive drive is typically an opening drive in order to be able to open the locking mechanism by an electric electromotive drive. However, this is not mandatory.

In the further prior art according to US 2017/0245378 A1 or according to US 2018/0245379 A1, the procedure is in each case such that only the control unit is arranged in the dry housing part, whereas the electromotive drive is arranged together with the locking mechanism in the wet housing part. This is disadvantageous insofar as the arrangement of the electromotive drive in the wet chamber housing part naturally shortens its service life, or unfavorable friction conditions are observed, for example in the event that dust or moisture penetrates into the wet room housing part.

The prior art has basically proven itself with regard to the installation of the electric motor drive in the dry housing part in accordance with the generic prior art according to EP 2 754 799 B1. This has a positive effect on the service life of the electric motor drive and tends to make it possible to work with a smaller motor because the friction conditions do not develop negatively over the service life due to penetrating dust, for example. However, the known teaching requires a complicated mechanical connection between the electromotive drive and the locking mechanism, which practically cancels out or even overcompensates for the previously described advantage of low operating forces. The invention as a whole seeks to remedy this.

SUMMARY OF DISCLOSURE

The invention is based on the technical problem of further developing a motor vehicle lock and in particular a motor vehicle door lock of the embodiment described at the outset in such a way that the electromotive drive can be designed with particularly low force, so that weight and cost advantages are observed over the prior art.

To solve this technical problem, a generic motor vehicle lock and in particular a motor vehicle door lock within the scope of the invention is characterized in that both housing parts of the housing are arranged parallel to one another and are connected to one another in a sealing manner at the edge.

The invention therefore initially draws on a special topological orientation of the two housing parts. These are specifically not oriented perpendicular or L-shaped relative to one another, contrary to the generic prior art according to EP 2754799 B1, but parallel. A particularly compact shape of the housing consisting of the two housing parts is thereby provided, which can be sealed particularly easily with respect to the environment, because both housing parts are sealingly connected to one another at the edge, and consequently the housing has the desired dust-tight and moisture-tight encapsulation.

Of course, excepted from this are the still necessary and obligatory inlet mouth in the wet chamber housing section, via which the locking bolt can enter and interact with the locking mechanism.

The parallel alignment of the two housing parts to each other and their edge-sealing connection to each other also makes it possible to design the mechanical connection from the electric motor drive to the locking mechanism in a particularly simple way. In fact, the electromotive drive generally works on the locking mechanism, and is therefore designed as an electromotive opening drive. In principle, however, the electromotive drive can also be used for other functions, for example as a locking drive.

Either way, the electromotive drive generally has a driver lever which penetrates a passage between the two housing parts. The driver lever for its part interacts regularly with a release lever, which in turn in the example lifts the pawl from its latching engagement with the rotary latch when the latching mechanism is in closed state. In addition, an actuating lever is usually also realized which is coupled to the driver lever. It is even possible for the actuating lever, the driver lever and the release lever to be designed as one lever, so that it is immediately clear that and how the mechanical connection from the electric motor drive to the locking mechanism can be simplified in accordance with the invention compared to the prior art. As a result of this, the electromotive drive can be designed to be small and cost-effective, because only low operating forces are thereby usually required to open the locking mechanism and, moreover, due to the arrangement of the electromotive drive in the dry housing part, wear due to environmental stresses practically does not occur for the reasons already described above.

The actuating lever, the driver lever, and also the release lever are generally made of plastic so that both a cost-optimized and cost-effective solution is available. In addition, this allows the passage between the two housing parts to be designed in a particularly advantageous and in particular tight manner. In fact, the passage is regularly the only connection between the two housing parts. If the passage is therefore designed to be sealed, any moisture or dust from the wet chamber housing part cannot enter the dry chamber housing part. For this purpose, the passage is advantageously designed as a rotary feedthrough with a seal.

In this context, the design can also be such that the seal is supported on the driver lever and rests against the top of the wet chamber housing part. In this case, the seal may be present and realized as a separate component. Furthermore, and as an alternative, the seal can also define a structural unit together with the driver lever. In this case, the seal is attached or molded on the driver lever, for example by an adhesive connection or in such a way that the seal is molded onto the driver lever. Such a procedure is recommended in particular in the event that the driver lever is made of plastic and the seal likewise produced from plastic is molded thereon.

At least one separate seal can also be provided for sealing the two housing parts in the edge region. However, it is also possible to connect the two housing parts to each other in the edge region with a material bond. In fact, the housing as a whole and consequently the two housing parts as well are generally made of plastic and designed as plastic injection molded parts. Consequently, such a material connection in the edge region of the two housing parts can be realized in such a way that the plastic of the housing is melted at points in the edge area, for example by a welding process (including ultrasonic welding or laser welding), and that thereby ensures the material connection of the two housing parts at this point.

It is also possible to connect the two housing parts to one another in the edge region by potting. An adhesive bond is also generally possible and conceivable in this context.

As a result, a motor vehicle lock and in particular a motor vehicle door lock is provided which initially ensures particularly reliable and low-friction operation of the electromotive drive by its arrangement in the dry chamber housing part. Furthermore, since the two housing parts are arranged parallel to each other according to the invention and are connected to each other at the edge in a sealing manner, an encapsulated design is provided for the overall housing, and the desired low-force operation of the electromotive drive is further supported. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 3:
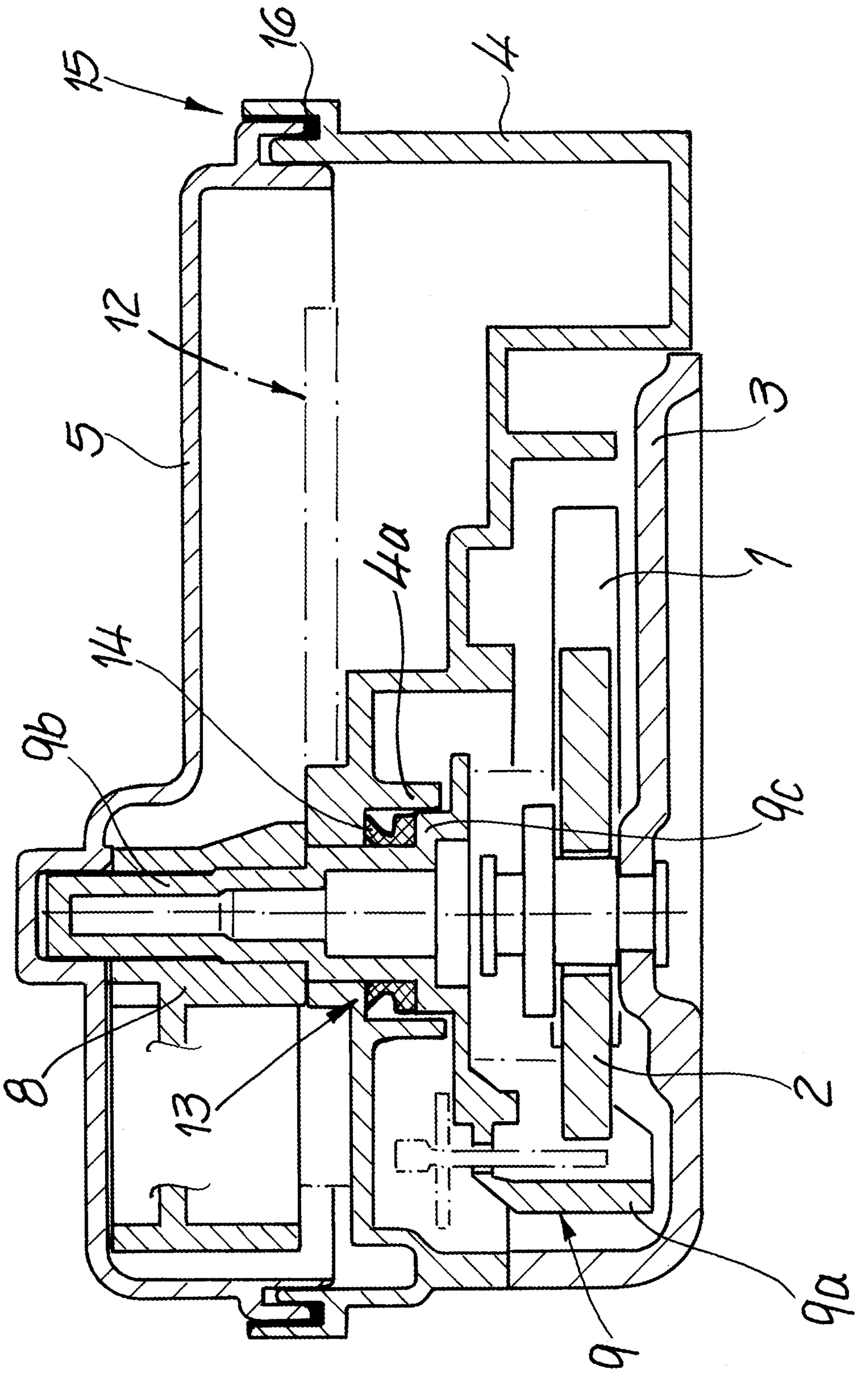

The figures show a motor vehicle lock, which is not restrictively a motor vehicle door lock, which is placed in or on a motor vehicle door (not shown). The shown vehicle door lock has a locking mechanism 1, 2, which can only be seen in FIG. 3, consisting essentially of a rotary latch 1 and a pawl 2. The locking mechanism 1, 2 is mounted in a lock case 3 which is attached or connected to a housing 4, 5.

In fact, according to the embodiment, the housing 4, 5 is designed in two parts and has a wet chamber housing part 4 and a dry chamber housing part 5. Since the locking mechanism 1, 2 is attached to or belongs to the lock case 3 on the wet chamber housing part 4, the wet chamber housing part 4 is not protected from dust or spray water in particular. This is because the lock case 3 has, as usual, an inlet mouth, not shown, via which a locking bolt can move into the locking mechanism 1, 2 and interact with it in a known manner. In contrast, the dry chamber housing part 5 is sealed against splash water and dust.

In addition to the locking mechanism 1, 2, the basic structure then also includes an electromotive drive 6, 7 which is located in the dry chamber housing part 5. The electromotive drive 6, 7 works on an actuating lever chain 8, 9 which, according to the embodiment, is composed of an actuating lever 8 and a driver lever 9.

In this way, actuation of the electromotive drive 6, 7 allows the locking mechanism 1, 2 to be opened with its aid. In fact, such an opening process corresponds to the driver lever 9, which can be seen in section in FIG. 3 in particular, lifting the pawl 2 from its latching engagement with the rotary latch 1 when the locking mechanism 1, 2 is in the closed position. For this purpose, the driver lever 9 has a release arm 9*a*. In addition, the electromotive drive 6, 7 is composed of an electric motor 6 on the one hand and an output pulley 7 on the other hand. For this purpose, the electric motor 6 is equipped with a worm on its output shaft, which meshes with an outer circumferential toothing of the output pulley 7 so that it can be set in rotation.

Figure 1:
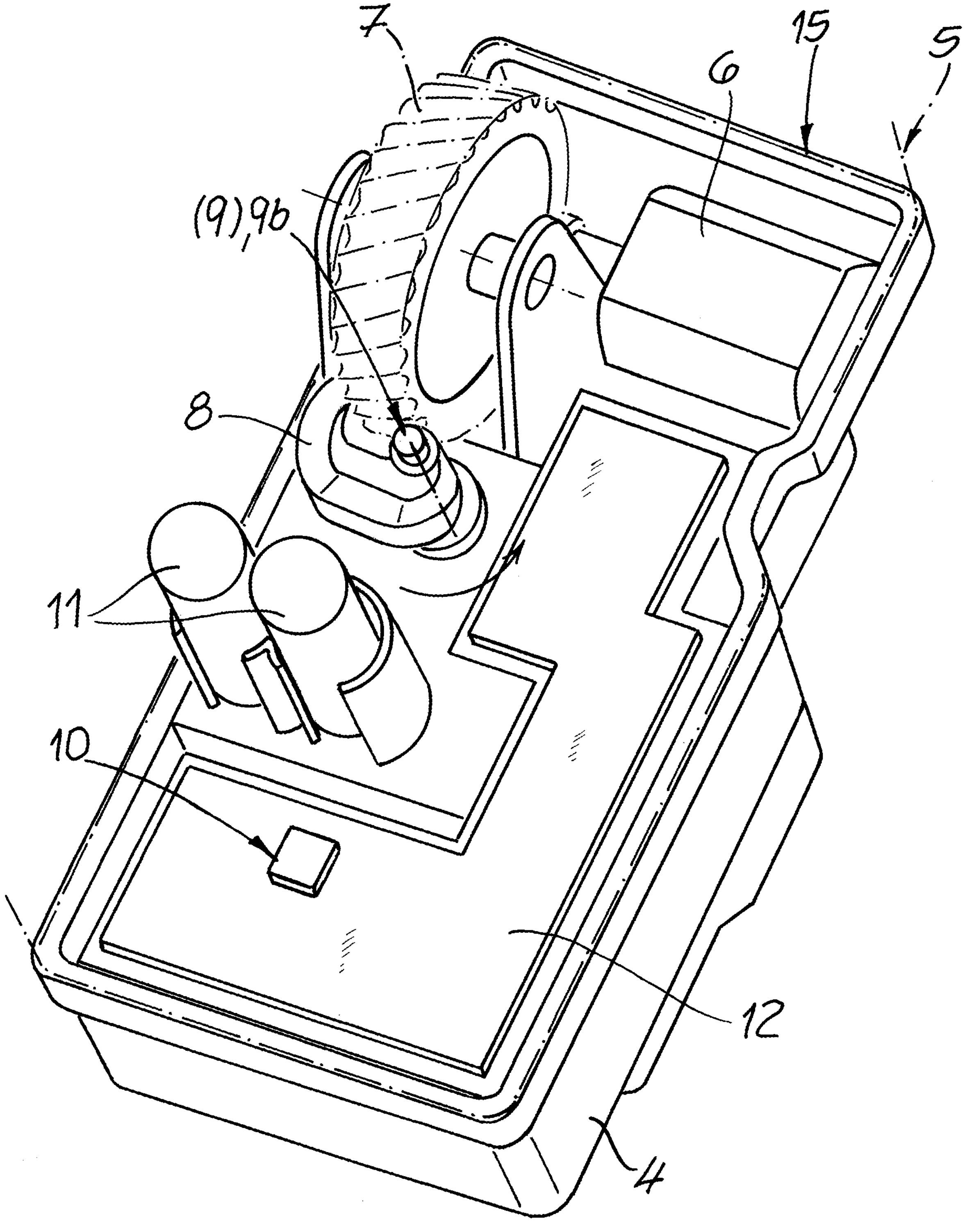
FIG. 1 shows a perspective overview of the motor-vehicle lock according to the invention.
Figure 2:
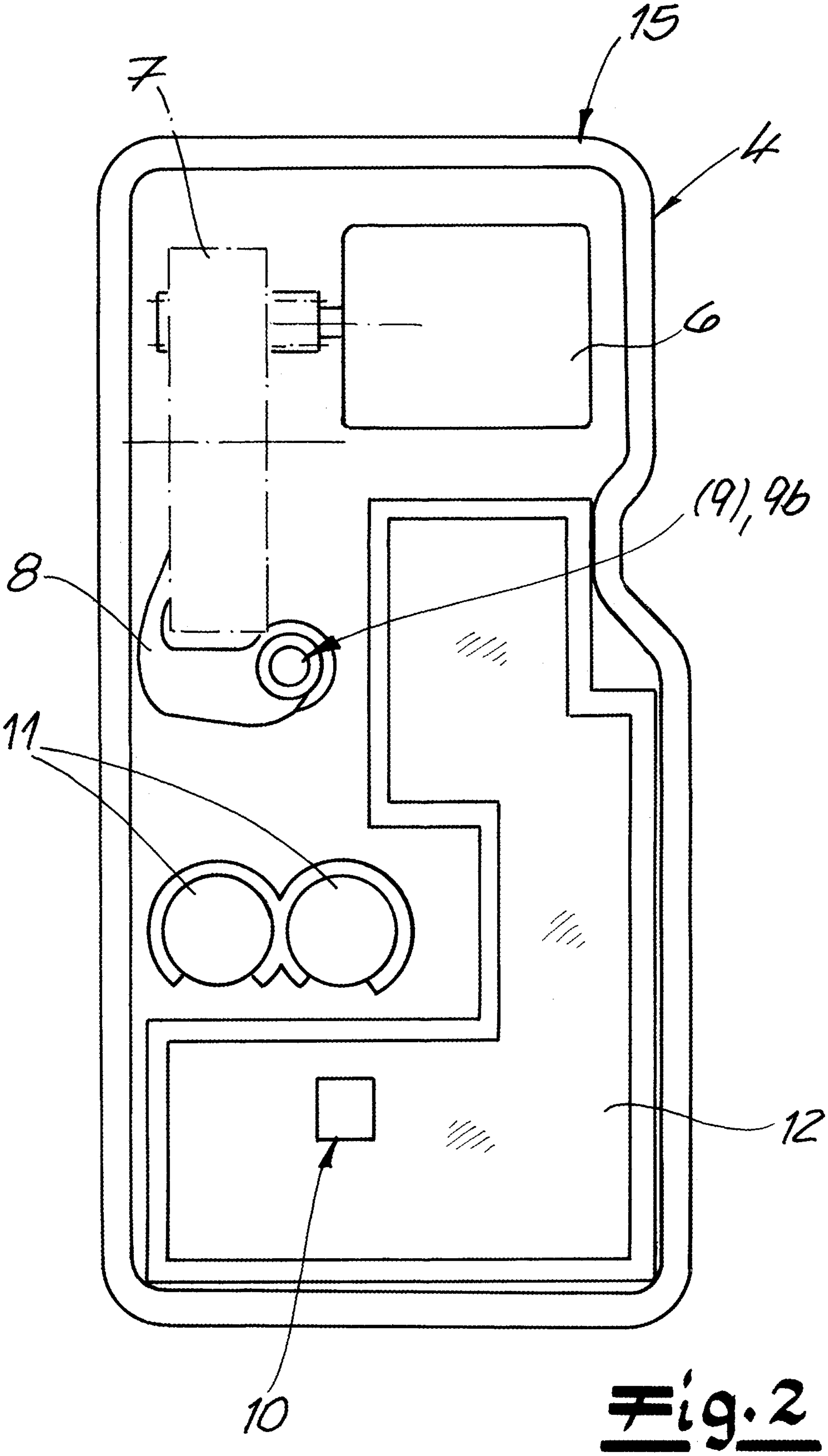
FIG. 2 shows a plan view of the object shown in FIG. 1, FIG. 3 schematically shows a cross-section through the object according to FIGS. 1 and 2.

On its rear surface not visible in FIG. 1, the output pulley 7 has a helical actuating contour on its rear surface, which cannot be seen in FIG. 1, which acts on the actuating lever 8 and ensures that it performs a counter-clockwise rotation about its shaft 9*b*, as indicated in FIG. 1, to open the locking mechanism 1, 2.

The shaft 9*b* of the actuating lever 8 is formed by a bearing pin 9*b* of the driver lever 9 which engages in the actuating lever 8. Since the actuating lever 8 and the driver lever 9 are coupled to one another in a rotationally fixed manner, the counterclockwise rotation of the actuating lever 8 in the illustration according to FIG. 1 for opening the locking mechanism 1, 2 causes the extension arm 9*a* on the driver lever 9 to be moved out of the drawing plane towards the viewer in the sectional view according to FIG. 3. This has the result that the pawl 2 is lifted from its latching engagement with the rotary latch 1. This releases a previously trapped locking bolt.

FIG. 1 then shows a control unit 10 and an emergency power source 11. The control unit 10 is a component of a printed circuit board 12 which, like the control unit 10, is located in the dry chamber housing part 5. The emergency power source 11 is also arranged on the printed circuit board 12, wherein it is two supercapacitors according to the embodiment, which are consequently likewise arranged in the dry chamber housing part 5. As a result, not only the electromotive drive 6, 7 is accommodated in the dry housing part 5 in a protected manner, but also the control unit 10, the emergency power source 11 and also the printed circuit board 12 with the additional electrical/electronic components located thereon and not expressly shown.

As already explained, the housing 4, 5 is equipped with at least two parts, with the wet chamber housing part 4 accommodating the locking mechanism 1, 2, and the dry chamber housing part 5 in which the electromotive drive 6, 7 and the control unit 10 are located, as well as the emergency power source 11 and finally the printed circuit board 12. According to the invention, both housing parts 4, 5 are now arranged parallel to one another and are connected to one another in a sealing manner at the edge, as can best be understood from the sectional view in FIG. 3.

The electromotive drive 6, 7 acts on the locking mechanism 1, 2, namely according to the embodiment in such a way that the actuating lever chain 8, 9 with the actuating lever 8 and the driver lever 9 are interposed at this point. In fact, the electromotive drive 1, 2 actuates the driver lever 9 which, to actuate the locking mechanism 1, 2, passes through a passage 13 between two housing parts 4, 5. The passage 13 represents the only connection between the two housing parts 4, 5. In addition, the passage 13 is designed as a rotary feedthrough with a seal 14.

In fact, the bearing pin 9*b* of the driver lever 9 penetrates the relevant passage 13 or the rotary feedthrough 13 with the seal 14. For this purpose, the design is such that the seal 14 is supported on the driver lever 9 and rests against the top of the wet chamber housing part 4. For supporting the seal 14, the driver lever 9 is equipped with a radial projection 9*c* opposite the bearing pin 9*b*. In the region of this rotary feedthrough 13, the design is also such that the upper side of the wet chamber housing part 4 is equipped with a vertically lowered annular wall 4*a*, which overall defines an annular housing that is open at the bottom, in which the seal 14 is accommodated together with the radial support 9*c* of the driver lever 9. On the underside of this annular housing, the extension arm 9*a* of the driver lever extends radially outwards, with the aid of which the driver lever 9 operates on the locking mechanism 1, 2.

The seal 14 already mentioned above and provided in the region of the rotary feedthrough 13 can thereby generally be designed as a separate component. However, it is also possible for the driver lever 9 and said seal 14 to define a structural unit 9, 14. In fact, the driver lever 9 is made of plastic. The same applies to the actuating lever 8. As a result, the possibility exists for the seal 14, which is also made of plastic, to be molded onto the driver lever 9, which is also produced from plastic, wherein this can be realized and implemented overall in a so-called two-component injection process. In this case, for example, a solid plastic for the driver lever 9 and an elastic plastic for the seal 14 are jointly processed and connected to one another.

The housing 4, 5 is also made of plastic, wherein the two housing parts 4, 5 are each plastic injection molded parts. The two housing parts 4, 5 are equipped with a seal (not shown) in their edge region 15. In fact, in the edge area 15, it is possible for the two housing parts 4, 5 to be connected to each other with a material bond. This can be realized in that the two housing parts 4, 5 are each equipped in the edge region with an interlocking U-shaped profile. In order to implement and realize the necessary tightness in the edge region 15, the aforementioned seal or a potting compound 16 indicated in FIG. 3 can be used at this point. However, it is also possible for the two housing parts 4, 5 to be (ultrasonically) welded to one another in the edge region 15. It is equally possible for the seal (not shown) to be molded onto one or both housing parts 4 in the edge region 15. Combinations are also conceivable.

In this case too, it is possible to work with a two-component injection molding process. This is because the particular housing part 4, 5 is made of plastic, as is the seal, so that said elements can be joined together in a material bond using the aforementioned two-component injection molding process.

LIST OF REFERENCE NUMBERS

1, 2 Locking mechanism
1 Rotary latch
2 Pawl
3 Lock case
4, 5 Housing
4 Wet chamber housing part
4*a* Annular wall
5 Dry chamber housing part
6, 7 Electromotive drive
6 Electric motor
7 Output pulley
8, 9 Actuating lever chain
8 Actuating lever
9 Driver lever
9*a* Release arm
9*b* Bearing pin, shaft
10 Control unit
11 Emergency power source
12 PCB
13 Rotary feedthrough
14 Seal
9, 14 Structural unit
15 Edge region
16 Potting compound

The invention claimed is:

1. A motor vehicle lock comprising:

a locking mechanism having a rotary latch and a pawl, at least one electromotive drive, a control unit, an at least two-part housing with a wet chamber housing part and a dry chamber housing part, wherein the drive and the control unit are arranged in the dry chamber housing part and the locking mechanism is arranged in the wet chamber housing part, and wherein the wet chamber housing part and the dry chamber housing part are arranged with a longitudinal axis of the wet chamber housing part parallel with a longitudinal axis of the dry chamber housing part and are sealingly connected to one another at an edge, an actuating lever that interacts with the electromotive drive, a driver lever, wherein the driver lever penetrates through a passage between the two housing parts, wherein the passage is the only internal connection between a wet chamber and a dry chamber, and a release arm that acts on the pawl to lift the pawl from engagement with the rotary latch, wherein the actuating lever, the driver lever, and the release arm are unitary, wherein the passage is a rotary feedthrough with a seal, wherein the driver lever includes a radial projection formed on a portion of the driver lever in the wet chamber, and wherein the seal is positioned on the radial projection and between the radial projection and a top of the wet chamber housing part.

2. The motor vehicle lock according to claim 1, wherein the electromotive drive works on the locking mechanism to drive the locking mechanism.

3. The motor vehicle lock according to claim 1, wherein the seal is supported on the driver lever and rests against a top of the wet chamber housing part.

4. The motor vehicle lock according to claim 1, wherein the seal is a separate component relative to the driver lever.

5. The motor vehicle lock according to claim 1, wherein the driver lever is made of plastic and the seal is molded onto the driver lever to form a structural unit.

6. The motor vehicle lock according to claim 1, wherein the two housing parts have a seal at the edge or are materially bonded to one another.

7. The motor vehicle lock according to claim 6, wherein the seal is molded onto one or both housing parts.

8. The motor vehicle lock according to claim 1, wherein an upper side of the wet chamber housing part has an annular wall that accommodates the seal in cooperation with the radial projection of the driver lever.

9. The motor vehicle lock according to claim 1, further comprising an emergency power source that is located in the dry chamber housing part.

10. The motor vehicle lock according to claim 1, wherein the seal is molded on a radial projection of the driver lever.

* * * * *